Sept. 15, 1953  A. O. GOLDSTEIN  2,652,086
BUN SLICER
Filed May 11, 1951
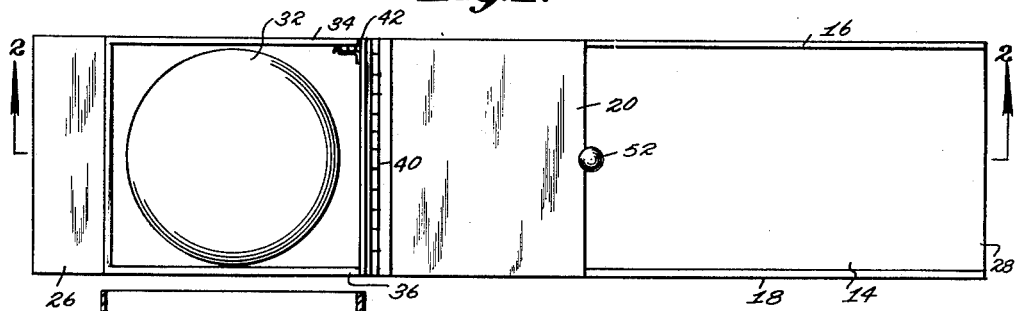
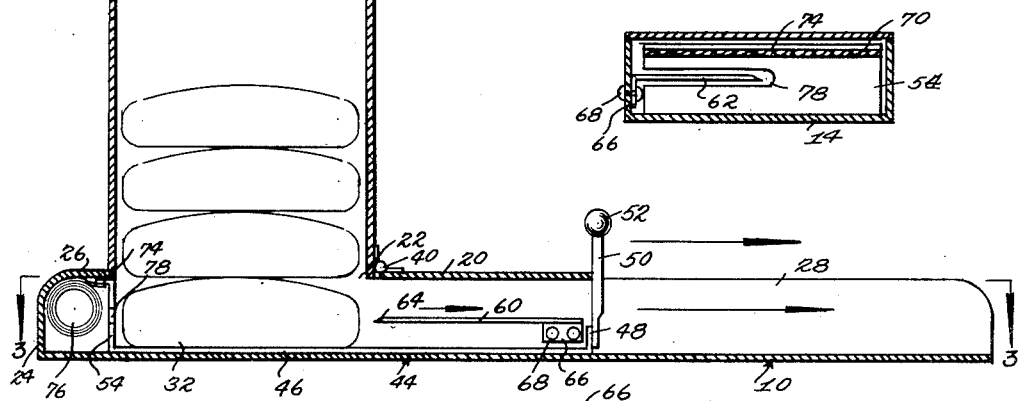
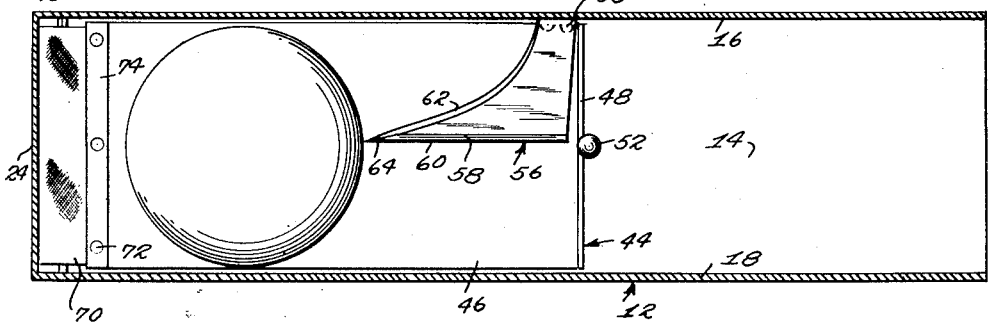
INVENTOR.
ADOLPH O. GOLDSTEIN
BY
McMorrow, Berman + Davidson
ATTORNEYS Patented Sept. 15, 1953

2,652,086

UNITED STATES PATENT OFFICE 2,652,086

BUN SLICER

Adolph O. Goldstein, Santa Cruz, Calif.

Application May 11, 1951, Serial No. 225,783

3 Claims. (Cl. 146—72)

This invention appertains to improvements in slicing apparatuses for slicing articles of foodstuff and especially relates to improvements in slicing machines for slicing or cutting buns or rolls.

The primary object of this invention is to provide a compact and inexpensive slicing unit, which will rapidly, accurately and completely or partially slice several varieties of sandwich, frankfurter, barbecue rolls or buns, without tearing, crumbling or distorting the rolls or buns.

Another object of this invention is to provide a small and compact manually actuated bun slicer, which can be mounted on a sandwich board and easily operated to slice buns or rolls, as they are needed for making sandwiches.

A further object of this invention is to provide a bun or roll cutter or slicer, having a hopper or magazine in which a number of buns or rolls may be stacked, the rolls being separately admitted into the cutter and individually sliced, with the rolls being retained in stacked formation, as one roll is being sliced, so that the rolls are sliced or cut as needed.

These and ancillary objects and structural features of merit are attained by this invention, the preferred embodiment of which is set forth in the following description and illustrated in the accompanying drawing, wherein:

Figure 1 is a top plan view of a bun cutter, constructed in accordance with the principles of this invention;

Figure 2 is a longitudinal vertical sectional view taken on line 2—2 of Figure 1;

Figure 3 is a longitudinal sectional view taken on line 3—3 of Figure 2, and,

Figure 4 is a transverse sectional view, illustrating the fixed cutter and extensible baffle structure.

In the embodiment illustrated in the accompanying drawing, the bun cutter or slicer 10 includes a housing 12, which is formed with a flat rectangular bottom wall 14 and upstanding side walls 16 and 18. A top wall 20 is fixed on the upper coplanar edges of the side walls 16 and 18 at the center thereof and forms a fixed baffle plate, which overlies the cutter in the housing. An opening 22 is formed in the top wall and an end wall 24 is formed on the housing integral with the end 26 of the top wall, with the opposing end being open. The opposing open end of the housing and the open top wall 28 define a discharge opening for the buns, after they are cut or sliced.

A hopper 30 is provided and is of a cross sectional shape to retain a plurality of rolls or buns 32 in stacked formation, the shape of the hopper being determined by the shape of the buns or rolls and the hopper being in communication with the opening 22 in the top wall 20. The hopper is formed with side walls 34 and 36 which are fixedly mounted at their lower ends to the sides 16 and 18 and a front wall 38, which is hinged by a piano hinge 40 to the rearward edge of the front wall 20, so that the front wall 38 is movable about the hinge as an axis to expose the interior of the hopper, whereby the rolls or buns 32 may be conveniently placed therein. A latch mechanism 42 is formed on the side wall 34 of the hopper and the front wall 38 to retain the front wall in a closed position, after the buns or rolls have been stacked therein.

A carrier member 44 is slidably disposed in the housing for movement from a position underlying the hopper to a position in communication with the opening 28. The carrier member includes a flat plate 46, which is slidably superimposed upon the bottom wall 14 of the housing and which is formed at its front end with an upstanding flange 48. A handle 50, which terminates at its outer terminal in a knob 52, is fastened to the flange 48, whereby the plate may be slidably moved on the bottom wall towards the discharge opening 28 in the top wall of the housing. An upstanding flange 54 is formed on the rear end of the plate 46 and constitutes a follower member for engaging the roll or bun, resting on the plate 46, so as to move the roll or bun to a fixed cutter means 56. The cutter means 56 includes a blade 58, which is formed with a cutting edge 60 arranged parallel to the side walls and a concave cutting edge 62, which extends from the cutting edge 60 to the side wall 16, whereby a piercing point 64 is defined by the abutting ends of the cutting edges. A lateral mounting flange 66 is formed on the blade and is fixed by a fastener 68 to the side wall 16, so that the blade is held in a horizontal position and spaced from the bottom wall 14 and top wall 20 of the housing. It will be noted that the blade is disposed immediately below the top wall 20, which forms a fixed baffle plate, so that the bun is retained in constant and effective engagement with the blade. The blade 58 will form a cut through the bun, so that only one side of the bun is open, whereby two portions, connected by a hinge portion, are obtained. This type of slice is preferred in making sandwiches but, of course, the bun can be completely sliced, by providing a blade, which would be disposed transversely between the side walls 16 and 18 of the housing.

Means is provided and is preferably actuated by the movement of the carrier member, relative to the fixed blade, for closing off the opening 22, whereby the buns or rolls 30 are retained in stacked formation within the hopper and the lowermost bun is prevented from dropping down into the housing, until the carrier member is returned to its normal position in alignment with the hopper. The means preferably includes a flexible baffle member 70, which may be formed from any suitable material and which has one of its ends affixed by pivots 72 or other conventional fasteners to a lateral flange 74, formed on the upper edge of the follower member or flange 54. The flexible baffle 70 is disposed on a spring roller 76, which is rotatably journaled between the side walls 16 and 18. The spring roller functions to retain the flexible baffle taut, as it is unrolled therefrom, upon movement of the carrier member and also, functions to automatically urge or bias the carrier member to its normal position, upon release of the handle 50, after the sliced bun has been removed from the carrier member.

A slot 78 is formed in the flange or follower member 54 for the reception of the blade, as the carrier member is moved from its normal position to a position in alignment with the opening 28, so that a complete cut may be made in the bun.

In use, the front wall 38 of the hopper is swung downwardly, so that the buns or rolls 32 may be placed in the hopper in orderly stacked formation. Of course, the cardboard package for the buns or rolls could be used as a hopper, with one end wall of the cardboard container being removed and being positioned on the housing, so as to be in communication with the opening 22 in the top wall.

The lowermost roll or bun in the stack will rest on the plate 46 of the carrier member, as seen in Figure 2, and when it is desired to slice or cut the roll, manual movement of the carrier member may be effected by grasping the handle 50 and moving the carrier member toward the opening 28 in the top wall. As the carrier member is moved, the plate 46 sliding on the bottom wall 14 of the housing, the bun will be moved by the follower member or flange 54 through the blade or cutter and a slice will be made in the bun, without crumbling, distorting or otherwise damaging the bun. During the movement of the carrier member in the housing, the flexible baffle will be unwound from the spring roller 76 and will underlie the subsequent lowermost bun in the hopper to retain the buns in orderly stacked formation, thus obviating the possibility of the lowermost bun gravitating down into the housing, rearwardly of the displaced carrier member.

Upon release of the handle 50, after the sliced bun has been extracted through the opening 28 in the top wall, the carrier member will be urged to its normal position by the retracting movements of the flexible baffle, under the urgement of the spring roller 76. The carrier member will be properly positioned in the housing and the possibility of the flange or follower member 54 damaging the spring roller will be obviated, since the forward edge of the top wall 26 will act as an abutment or stop in engaging the upstanding handle 50.

Of course, the flange 48 can be removed, so that the plate 46 is flat at the outer end and the handle 50 can be disposed at one side of the plate or opposite to the side wall 16 of the housing, whereby the buns after passing through the cutter blade, can be dispensed through the open end of the housing.

Having thus described this invention, what is claimed is:

1. A slicing apparatus comprising a housing having a bottom wall and a spaced top wall, said top wall being formed with an opening, a hopper mounted on the top wall for retaining articles in stacked formation and communicated with the opening, a carrier member slidably disposed in the housing and adapted to underlie the hopper for receiving an article from the hopper, a flexible baffle member connected to the carrier member for closing off the hopper upon movement of the carrier member from alignment with the opening, resilient means biasing said baffle member out of closing position, and a knife fixedly mounted in the housing in the path of movement of the carrier for slicing an article disposed thereon.

2. A slicing apparatus comprising a housing having a bottom wall and a spaced top wall, said top wall being formed with an opening, a hopper mounted on the top wall for retaining articles in stacked formation and communicated with the opening, a carrier member slidably disposed in the housing and adapted to underlie the hopper for receiving an article from the hopper, a flexible baffle member connected to the carrier member, a spring roller journaled in the housing rearwardly of said opening, said flexible baffle being rolled on said roller and secured thereto, said baffle member being unwound from the roller upon movement of the carrier member to underlie the hopper and close off the opening in the top wall, and a fixed cutter carried by the housing and interposed in the path of movement of the carrier to slice an article on the carrier member, said spring roller being operative to return the carrier member to its normal position underlying the hopper.

3. A slicing apparatus comprising a housing, a top wall formed with an opening, a carrier member slidably disposed in the housing and including a plate having an upstanding follower flange, said plate being normally aligned with the opening in the top wall for receiving an article to be sliced, an upstanding handle on said plate for manual movement of the plate with the follower flange moving the article through the housing and a fixed blade in said housing and interposed transversely in the path of movement of the carrier member, said follower flange having a slot therein for the passage of the blade therethrough after cutting the article, a hopper mounted on the housing in communication with the opening in the top wall for retaining articles in stacked formation, a spring roller journaled in the housing rearwardly of said opening, a flexible member fixed to and wound on said roller and connected to the follower flange for closing off the opening upon movement of the carrier member, said roller biasing the carrier member upon release of the handle to its normal position underlying the hopper.

ADOLPH O. GOLDSTEIN.

References Cited in the file of this patent

UNITED STATES PATENTS

| Number | Name | Date |
|---|---|---|
| 982,366 | Hunberford | Jan. 24, 1911 |
| 2,009,913 | Bever | July 30, 1935 |
| 2,595,481 | Palmos | May 6, 1952 |

FOREIGN PATENTS

| Number | Country | Date |
|---|---|---|
| 358,093 | Great Britain | Oct. 5, 1931 |
| 371,046 | Great Britain | Apr. 21, 1932 |